United States Patent
Ho et al.

(10) Patent No.: US 9,438,514 B2
(45) Date of Patent: Sep. 6, 2016

(54) WIRELESS ELECTRONIC DEVICE AND WIRELESS TRANSMISSION METHOD THEREOF

(71) Applicant: Wistron NeWeb Corp., Hsinchu (TW)

(72) Inventors: Yung-Fa Ho, Hsinchu (TW); Ching-Po Chiu, Hsinchu (TW); Chia-Wei Lin, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 412 days.

(21) Appl. No.: 14/072,082

(22) Filed: Nov. 5, 2013

(65) Prior Publication Data

US 2015/0048975 A1 Feb. 19, 2015

(30) Foreign Application Priority Data

Aug. 13, 2013 (TW) .............................. 102128946 A

(51) Int. Cl.
| | |
|---|---|
| *H04B 7/00* | (2006.01) |
| *H01Q 3/00* | (2006.01) |
| *H04L 12/741* | (2013.01) |
| *H04W 4/00* | (2009.01) |
| *H04L 29/12* | (2006.01) |
| *H04L 12/721* | (2013.01) |

(52) U.S. Cl.
CPC .............. *H04L 45/74* (2013.01); *H01Q 3/00* (2013.01); *H04L 61/6022* (2013.01); *H04W 4/008* (2013.01); *H04L 45/66* (2013.01)

(58) Field of Classification Search
CPC ....................................................... H04B 7/10

USPC ........ 342/367, 371, 372, 417; 343/754, 797; 455/522

See application file for complete search history.

(56) References Cited

U.S. PATENT DOCUMENTS

| | | | | |
|---|---|---|---|---|
| 4,940,987 A | * | 7/1990 | Frederick | .................. G01S 7/24 342/180 |
| 6,486,832 B1 | | 11/2002 | Abramov et al. | |
| 2004/0051677 A1 | | 3/2004 | Gottl | |
| 2006/0084461 A1 | | 4/2006 | Sekiya et al. | |

FOREIGN PATENT DOCUMENTS

| | | |
|---|---|---|
| CN | 1726616 A | 1/2006 |
| CN | 101466162 A | 6/2009 |

* cited by examiner

*Primary Examiner* — Dao Phan
(74) *Attorney, Agent, or Firm* — Muncy, Geissler, Olds & Lowe, P.C.

(57) ABSTRACT

The present invention discloses a wireless electronic device including an adaptive antenna device, a wireless communication module and a processing unit. The adaptive antenna includes a horizontal antenna module arranged to transmit data in a plurality of certain horizontal directions and a vertical antenna module arranged to transmit data in a plurality of certain vertical directions. The processing unit enables the wireless communication module to enable the horizontal antenna module to scan signals along the certain horizontal directions to obtain a horizontal scan result when the wireless electronic device is powered up. The processing unit further determines whether at least one electronic device is available in at least one of the certain horizontal directions according to the horizontal scan result, and enables the horizontal antenna module and the vertical antenna module to directionally transmit data to the electronic device in the certain horizontal directions.

14 Claims, 2 Drawing Sheets

WIRELESS ELECTRONIC DEVICE AND WIRELESS TRANSMISSION METHOD THEREOF

CROSS REFERENCE TO RELATED APPLICATIONS

This application claims priority of Taiwan Patent Application No. 102128946, filed on Aug. 13, 2013, the entirety of which is incorporated by reference herein.

BACKGROUND OF THE INVENTION

1. Field of the Invention

The present invention is related to a wireless transmission method of a wireless electronic device, and in particular to a wireless transmission method of a wireless electronic device with a horizontal antenna module and a vertical antenna module.

2. Description of the Related Art

Presently, mobile devices are highly developed and multi-functional. For example, handheld devices such as mobile phones and tablets are capable of conducting telecommunications, receiving and transmitting e-mails, maintaining social networks, managing contacts, and playing media. Hence, users can implement various applications on their mobile devices, such as a simple phone call, social network interaction, or commercial transactions. Therefore, mobile devices have become one of the necessities in people's lives.

Most of the current handheld devices include a communication module arranged to connect to a network through wireless or wire channel. In the next generation of communication systems, the research and development goals are to reach a better data transfer rate, such that a better mechanism to implement wireless communications is in need.

BRIEF SUMMARY OF THE INVENTION

A detailed description is given in the following embodiments with reference to the accompanying drawings.

The present invention discloses a wireless electronic device including an adaptive antenna device, a wireless communication module, and a processing unit. The adaptive antenna device is arranged to directionally transmit data, wherein the adaptive antenna device further includes a horizontal and a vertical antenna module. The horizontal antenna module is arranged to transmit data in a plurality of certain horizontal directions. The vertical antenna module is arranged to transmit data in a plurality of certain vertical directions. The wireless communication module is arranged to enable the adaptive antenna device. The processing unit is arranged to enable the wireless communication module to enable the horizontal antenna module of the adaptive antenna device to scan signals along certain horizontal directions, respectively, for obtaining a horizontal scan result when the wireless electronic device is powered up. The processing unit is further arranged to determine whether at least one electronic device is available in at least one of the certain horizontal directions, respectively, according to the horizontal scan result, and enable the wireless communication module to enable the horizontal antenna module and the vertical antenna module to directionally transmit data to the at least one electronic device in the at least one certain horizontal direction.

The present invention further discloses a wireless transmission method, applied to a wireless electronic device. The wireless electronic device includes an adaptive antenna device having a horizontal antenna module and a vertical antenna module. The wireless transmission method includes: enabling the horizontal antenna module of the adaptive antenna device to scan signals along a plurality of certain horizontal directions, respectively, to obtain a horizontal scan result when the wireless electronic device is powered up; determining whether at least one electronic device is available in at least one of the certain horizontal directions according to the horizontal scan result; and enabling the horizontal antenna module and the vertical antenna module to directionally transmit data to the at least one electronic device in the at least one certain horizontal direction.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
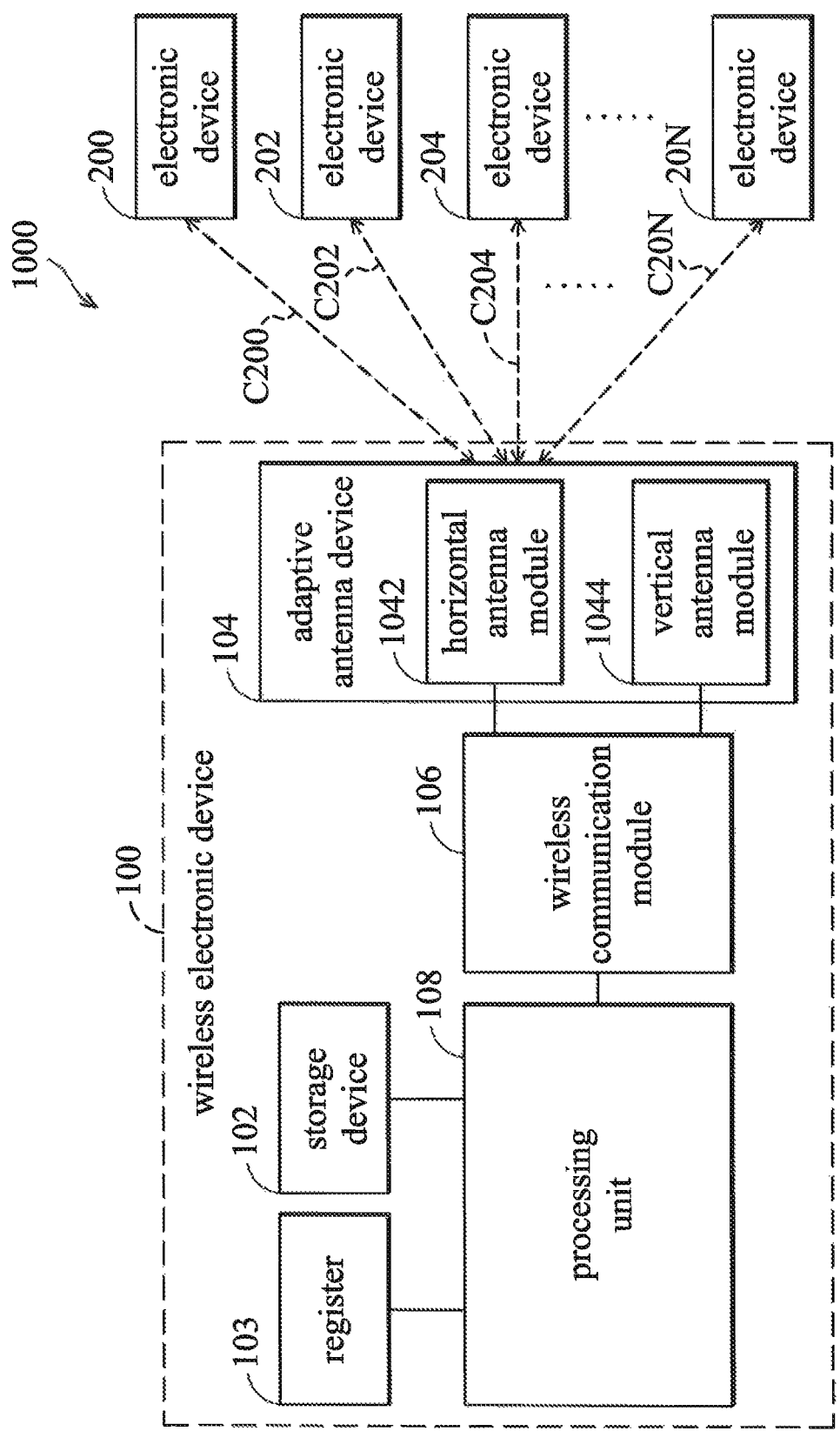
FIG. 1 is a schematic diagram illustrating an embodiment of a wireless electronic system of the present invention.

FIG. 1 is a schematic diagram illustrating an embodiment of a wireless electronic system of the present invention. The wireless electronic system 1000 includes a wireless electronic device 100 and at least one electronic device 200-20N.

The wireless electronic device 100 is arranged to transmit data to the at least one electronic device 200-20N and receive data from the at least one electronic device 200-20N through at least one wireless channel C200-C20N. The medium of the at least one wireless channel C200-C20N may be air or other mediums which can transmit radio waves. It should be noted that the electronic devices 200-20N may be arranged in different positions. The wireless electronic device 100 is arranged to directionally transmit data to the electronic devices 200-20N according to the positions of the electronic devices 200-20N, respectively, and receive data from the electronic devices 200-20N. It should be noted that the wireless electronic device 100 may directionally transmit data and omnidirectionally receive data, but it is not limited thereto. In one of the embodiments, the wireless electronic device 100 is arranged to transfer data with the electronic devices 200-20N by packets, but it is not limited thereto. It should be noted that the wireless electronic device 100 may determine the RF parameters corresponding to the electronic devices 200-20N based on the packets received from the electronic devices 200-20N. For example, the wireless electronic device 100 may determine the present RF parameters of the wireless channel C200 according to the packets received from the wireless channel C200. In one of the embodiments, the RF parameters include Packet Error Rate (PER), Received Signal Strength (RSSI) and/or TX POWER, etc., but it is not limited thereto. In one embodiment, the wireless electronic device 100 includes a storage device 102, a register 103, an adaptive antenna device 104, a wireless communication module 106 and a processing unit 108.

The storage device 102 is arranged to store a plurality of antenna pattern tables, a connection table and a network management database. Each of the antenna pattern tables is arranged to record the relationships between a plurality of antenna patterns and a plurality of predetermined RF parameters set. For example, the processing unit 108 can obtain an antenna pattern corresponding to a predetermined RF parameters set from the antenna pattern tables according to the present RF parameters of the received packets, wherein one of the predetermined RF parameters set is selected according to the difference of the present RF parameters and the predetermined RF parameters sets, wherein the difference of the present RF parameters and the selected predetermined RF parameters set is less than a predetermined value. The processing unit 108 is further arranged to provide the antenna pattern corresponding to the selected predetermined RF parameters set to the wireless communication module 106 to enable the adaptive antenna device 104. The connection table is arranged to record the at least one MAC address of the at least one electronic device 200-20N connected to the wireless electronic device 100, and the network management database is arranged to record the at least one RF parameters set of the electronic device 200-20N connected to the wireless electronic device 100.

The register 103 is arranged to store temperature data. For example, in this embodiment, the register 103 is arranged to store the horizontal scan result of the adaptive antenna device 104, wherein the horizontal scan result may include a plurality of MAC addresses (STA MAC Address) and a plurality of RF parameters sets of the electronic devices 200-20N, respectively, but it is not limited thereto.

The adaptive antenna device 104 is arranged to directionally transmit data. It should be noted that, in this embodiment, the adaptive antenna device 104 may transmit data (signals) according to different horizontal directions and different vertical directions. More specifically, the wireless communication module 106 is arranged to control at least one direction of data transmission of the adaptive antenna device 104 by at least one antenna pattern, wherein each of the antenna patterns corresponds to one wireless channel. For example, the adaptive antenna device 104 may be an antenna array with a plurality of antennas, the wireless communication module 106 controls the direction of each of the antennas to beam forming a radiation pattern according to the antenna pattern, but it is not limited thereto. In other embodiments, the adaptive antenna device 104 may be a plurality of directional antennas or a reconfigurable antenna, wherein the wireless communication module 106 may control the plurality of directional antennas or the reconfigurable antenna by at least one antenna pattern. In one of the embodiments, the adaptive antenna device 104 includes a horizontal antenna module 1042 and a vertical antenna module 1044. The horizontal antenna module 1042 is arranged to transmit data in a plurality of certain horizontal directions. The vertical antenna module 1044 is arranged to transmit data in a plurality of certain vertical directions. It should be noted that the certain horizontal directions are the angular orientations in the horizontal plane, and the certain vertical directions are the angular orientations in the vertical plane. Moreover, the horizontal antenna module 1042 and the vertical antenna module 1044 may form at least one fan-shaped or circular radiation pattern according to the at least one certain horizontal direction and the at least one certain vertical direction for directionally transmitting data in at least one specific direction.

The wireless communication module 106 is arranged to enable the adaptive antenna device 104 according to at least one antenna pattern, wherein the antenna pattern is arranged to determine one of the certain horizontal directions and one of the certain vertical directions of the adaptive antenna device 104 for directionally transmitting data, and one antenna pattern controls one direction of data transmission for one wireless channel. Moreover, the wireless communication module 106 is arranged to encode data into packets for transmitting data to the electronic devices 200-20N through the adaptive antenna device 104 and the wireless channels C200-C20N, and decode packets received from the electronic devices 200-20N through the wireless channels C200-C20N for providing the data to the processing unit 108.

The processing unit 108 may include a central-processing unit (CPU) or a plurality of processing units in a parallel processing environment. Moreover, the processing unit 180 may include a memory. The memory may include a read only memory (ROM), a flash ROM and/or a random access memory (RAM) for storing the program codes which are arranged to be executed by the processing unit 108. It should be noted that the memory may be implemented in the storage device 102 and/or the register 103, but it is not limited thereto.

In one embodiment, the processing unit 108 includes an operating system and an RF parameters management module, but it is not limited thereto. The processing unit 108 is arranged to enable the wireless communication module 106 to enable the horizontal antenna module 1042 of the adaptive antenna device 104 to scan signals along the plurality of certain horizontal directions, respectively, to obtain a horizontal scan result when the wireless electronic device 100 is powered up. Namely, the processing unit 108 is arranged to enable the wireless communication module 106 to enable the horizontal antenna module 1042 of the adaptive antenna device 104 to scan signals for a site survey. It should be noted that the horizontal scan result may include the MAC address(es) and the RF parameters set(s) corresponding to the electronic device(s). Namely, the horizontal scan result will not include any MAC address or RF parameter if there is no electronic device in the certain horizontal directions during the horizontal scan. For example, the horizontal antenna module 1042 may scan signals in four different certain horizontal directions which have four different angles in the horizontal plane, but it is not limited thereto. In other embodiments, the horizontal antenna module 1042 may scan signals in 2~100 or more than 100 certain horizontal directions with different angles in the horizontal plane. The processing unit 108 is further arranged to determine whether there is any electronic device in the certain horizontal directions, respectively, according to the horizontal scan result. Namely, the processing unit 108 scans signals by the horizontal antenna module 1042 in each of the certain horizontal directions, respectively, and determines whether there is any electronic device which is capable of connecting with the wireless electronic device 100, and the processing unit 108 is further arranged to determine which of the certain horizontal directions is(are) the electronic device(s) arranged in. For example, the processing unit 108 may determine whether at least one electronic device is available in the certain horizontal directions based on whether the horizontal scan result includes the MAC address(es) or not.

It should be noted that, in another embodiment, the processing unit 108 is further arranged to determine whether the RF parameters set(s) of the horizontal scan result meets a predetermined standard to make sure whether the at least one electronic device is arranged in the certain horizontal directions, wherein the processing unit 108 determines that there is an electronic device in the certain horizontal direction when the RF parameters set meets the predetermined standard. Furthermore, the processing unit 108 ignores the MAC address and the RF parameters set of the horizontal scan result when the RF parameters set does not meet the predetermined standard.

The processing unit 108 enables the wireless communication module 106 to enable the horizontal antenna module 1042 and the vertical antenna module 1044 after the processing unit 108 determines that there is at least one electronic device arranged in the at least one certain horizontal direction. Next, the horizontal antenna module 1042 and the vertical antenna module 1044 are arranged to directionally transmit data to the at least one wireless channel of the at least one electronic device according to the at least one certain horizontal direction which has the electronic device. For example, after the processing unit 108 determines that there is a first electronic device capable of being connected to the wireless electronic device 100 in a first certain horizontal direction, the wireless communication module 106 enables the horizontal antenna module 1042 and the vertical antenna module 1044 to form a vertical radiation pattern in the first certain horizontal direction to directionally transmit data to the first electronic device, wherein the horizontal antenna module 1042 and the vertical antenna module 1044 are arranged to form the wireless channel C200 which covers all the vertical directions in the first certain horizontal direction, but it is not limited thereto.

In another embodiment, after determining that the at least one electronic device is in the at least one certain horizontal direction, the processing unit 108 is further arranged to enable the vertical antenna module 1044 to vertically scan signals along the at least one certain horizontal direction corresponding to the at least one electronic device to obtain a vertical scan result, wherein the vertical scan result may be stored in the register 103 and include at least one MAC address and at least one RF parameters set of the at least one electronic device. Namely, the processing unit 10 enables the vertical antenna module 1044 to execute a vertical scan in the certain horizontal direction of the electronic device to determine the certain vertical direction of the electronic device after determining there is an electronic device in the certain horizontal direction. Next, the processing unit 108 enables the wireless communication module 106 to enable the horizontal antenna module 1042 and the vertical antenna module 1044 to directionally transmit data to the corresponding electronic device according to the certain horizontal direction and the certain vertical direction which have the electronic device through the wireless channel formed in the certain horizontal direction and the certain vertical direction. For example, after the processing unit 108 determines that is have a second electronic device 202 capable of connecting with the wireless electronic device 100 in a second certain horizontal direction and a second certain vertical direction, the wireless communication module 106 enables the horizontal antenna module 1042 and the vertical antenna module 1044 to form a specific radiation pattern in the cross of the second certain horizontal direction and the second certain vertical direction to directionally transmit data to the second electronic device, but it is not limited thereto.

More specifically, after the processing unit 108 determines that there is an electronic device in the certain horizontal direction and/or the certain vertical direction, the processing unit 108 is further arranged to update the connection table and the network management database according to the RF parameters set and the MAC address of the determined electronic device. Namely, the processing unit 108 is further arranged to update the connection table and the network management database according to the RF parameters set which meets the predetermined standard and the corresponding MAC address. Next, the processing unit 108 is further arranged to select one of the antenna patterns from one of the antenna pattern tables according to the updated connection table and the updated network management database. Namely, the processing unit 108 is further arranged to select an antenna pattern which can form a specific radiation pattern according to the RF parameters of the updated connection table and the updated network management database. Next, the wireless communication module 106 is further arranged to enable the horizontal antenna module 1042 and the vertical antenna module 1044 of the adaptive antenna device 104 to directionally transmit data to the electronic device in the specific direction according to one of the antenna patterns selected by the processing unit 108. It should be noted that the specific direction includes the vertical directions which can be covered by the radiation pattern of the vertical antenna module 1044 in a certain horizontal direction or a direction crossed by a certain horizontal direction and a certain vertical direction.

Figure 2:
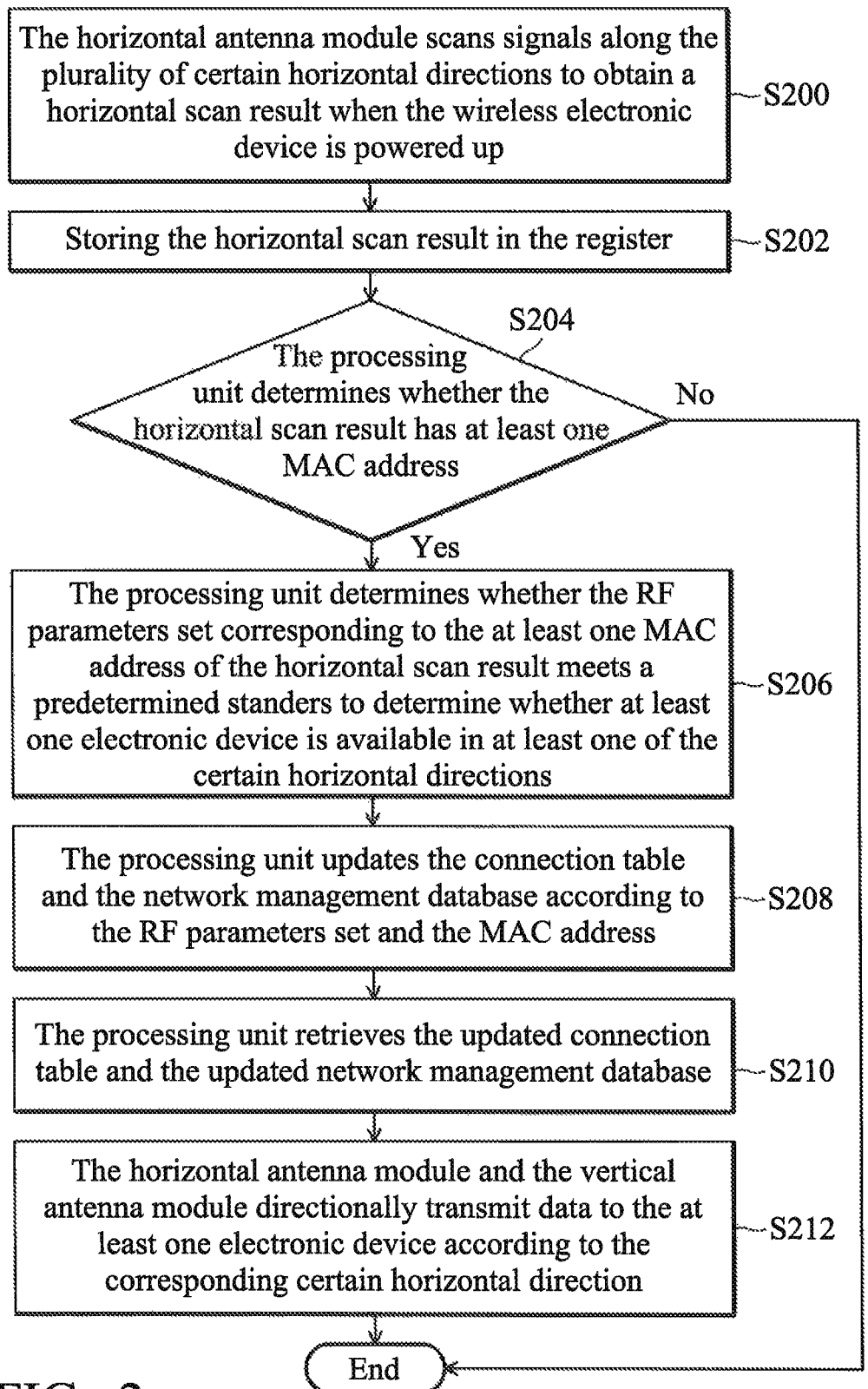
FIG. 2 is a flowchart of a wireless transmission method according to an embodiment of the present invention.

FIG. 2 is a flowchart of a wireless transmission method according to an embodiment of the present invention. The wireless transmission method is applied to the wireless electronic device 100 of FIG. 1. The process starts at step S200.

In step S200, the processing unit 108 is arranged to enable the wireless communication module 106 to enable the horizontal antenna module 1042 of the adaptive antenna device 104 to scan signals in the plurality of certain horizontal directions, respectively, to obtain a horizontal scan result when the wireless electronic device 100 is powered up. It should be noted that the horizontal scan result may include the MAC address(es) and the RF parameters set(s) corresponding of the electronic device(s). Namely, the horizontal scan result will not include any MAC address or RF parameter if there is no electronic device in the certain horizontal directions during the horizontal scan. For example, the horizontal antenna module 1042 may scans signals in four different certain horizontal directions which have four different angles in the horizontal plane, but it is not limited thereto. In other embodiments, the horizontal antenna module 1042 may scan signals in 2~100 or more than 100 certain horizontal directions at different angles in the horizontal plane.

Next, in step S202, the processing unit 108 or the wireless communication module 106 stores the horizontal scan result in the register 103.

Next, in step S204, the processing unit 108 is further arranged to determine whether of the horizontal scan result has at least one MAC address. For example, the processing unit 108 may determine whether at least one electronic device is available in at least one of the certain horizontal directions according to whether the horizontal scan result has MAC address(es) or not. Namely, the processing unit 108 scans signals by the horizontal antenna module 1042 in each of the certain horizontal directions, respectively, and determines whether there is any electronic device which is capable of connecting with the wireless electronic device 100 and the direction(s) of the electronic device(s) which may connect to the wireless electronic device 100. When the horizontal scan result has at least one MAC address, the process goes to step S204; otherwise, the process ends at step S202.

In step S206, the processing unit 108 is arranged to determine whether the RF parameters set(s) of the horizontal scan result meets a predetermined standard to make sure that the electronic device is arranged in the certain horizontal direction. When the RF parameters set of the horizontal scan result meets the predetermined standard, the processing unit 108 determines that the electronic device is in the certain horizontal direction. When the RF parameters set(s) of the horizontal scan result does not meet the predetermined standard, the processing unit 108 ignores the RF parameters set and the corresponding MAC address of the horizontal scan result.

Next, in step S208, the processing unit 108 is further arranged to update the connection table and the network management database according to the RF parameters set and the MAC address of the determined electronic device after the processing unit 108 determines that there is at least one electronic device in the at least one certain horizontal direction and/or the at least one certain vertical direction. Namely, the processing unit 108 is further arranged to update the connection table and the network management database according to the RF parameters set which meets the predetermined standard and the corresponding MAC address.

Next, in step S210, the processing unit 108 retrieves the updated connection table and the updated network management database.

Next, in step S212, the processing unit 108 enables the wireless communication module 106 to enable the horizontal antenna module 1042 and the vertical antenna module 1044 to directionally transmit data to the at least one electronic device according to the at least one certain horizontal direction. More specifically, the processing unit 108 is further arranged to select one of the antenna patterns from one of the antenna pattern tables according to the updated connection table and the updated network management database. Namely, the processing unit 108 is further arranged to select an antenna pattern which can form a specific radiation pattern according to the RF parameters of the updated connection table and the updated network management database. Next, the wireless communication module 106 is further arranged to enable the horizontal antenna module 1042 and the vertical antenna module 1044 of the adaptive antenna device 104 to transmit data to the electronic device in the specific direction according to one of the antenna patterns selected by the processing unit 108.

For example, after the processing unit 108 determines that there is a first electronic device capable of being connected to the wireless electronic device 100 in a first certain horizontal direction, the wireless communication module 106 enables the horizontal antenna module 1042 and the vertical antenna module 1044 to form a vertical radiation pattern in the first certain horizontal direction to directionally transmit data to the first electronic device, wherein the horizontal antenna module 1042 and the vertical antenna module 1044 are arranged to form the wireless channel C200 which covers all the vertical directions in the first certain horizontal direction, but it is not limited thereto.

In another embodiment, after determining that the at least one electronic device is in the at least one certain horizontal direction, the processing unit 108 is further arranged to enable the vertical antenna module 1044 to vertically scan signals along the at least one certain horizontal direction corresponding to the at least one electronic device to obtain a vertical scan result, wherein the vertical scan result may be stored in the register 103 and include at least one MAC address and at least one RF parameters set of the at least one electronic device. Namely, the processing unit 10 enables the vertical antenna module 1044 to execute a vertical scan in the certain horizontal direction of the electronic device to determine the certain vertical direction of the electronic device after determining there is an electronic device in the certain horizontal direction. Next, the processing unit 108 enables the wireless communication module 106 to enable the horizontal antenna module 1042 and the vertical antenna module 1044 to directionally transmit data to the corresponding electronic device according to the certain horizontal direction and the certain vertical direction which have the electronic device through the wireless channel formed in the certain horizontal direction and the certain vertical direction. For example, after the processing unit 108 determines that there is a second electronic device 202 capable of connecting with the wireless electronic device 100 in a second certain horizontal direction and a second certain vertical direction, the wireless communication module 106 enables the horizontal antenna module 1042 and the vertical antenna module 1044 to form a specific radiation pattern in the cross of the second certain horizontal direction and the second certain vertical direction to directionally transmit data to the second electronic device, but it is not limited thereto. The process ends at step S212.

The wireless electronic device 100 and the wireless transmission method of the embodiments may determine the directions of the signal transmission by a specific scan process when the wireless electronic device 100 is powered up.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A wireless electronic device, comprising:
   an adaptive antenna device, arranged to directionally transmit data, wherein the adaptive antenna device further comprises:
      a horizontal antenna module, arranged to transmit data in a plurality of certain horizontal directions; and a vertical antenna module, arranged to transmit data in a plurality of certain vertical directions;

a wireless communication module, arranged to enable the adaptive antenna device; and a processing unit, arranged to enable the wireless communication module to enable the horizontal antenna module of the adaptive antenna device to scan signals along the certain horizontal directions, respectively, to obtain a horizontal scan result when the wireless electronic device is powered up, wherein the processing unit is further arranged to determine whether an electronic device is available in one of the certain horizontal directions according to the horizontal scan result, and enables the vertical antenna module to form a vertical radiation pattern on the one of the certain horizontal directions in which the electronic device is available.

2. The wireless electronic device as claimed in claim 1, further comprising a register arranged to store the horizontal scan result, wherein the horizontal scan result comprises a MAC address and a RF parameters set corresponding to the electronic device.

3. The wireless electronic device as claimed in claim 2, wherein the processing unit is further arranged to determine whether the RF parameters set meets a predetermined standard, and determine that the electronic device is arranged in the one of the certain horizontal directions when the RF parameters set meets the predetermined standard.

4. The wireless electronic device as claimed in claim 3, further comprising a storage device arranged to store a connection table and a network management database, wherein the connection table is arranged to record the MAC addresses of electronic devices connected with the wireless electronic device, and the network management database is arranged to record the RF parameters sets of electronic devices connected with the wireless electronic device.

5. The wireless electronic device as claimed in claim 4, wherein the processing unit is further arranged to update the connection table and the network management database based on the RF parameters set and the corresponding MAC address of the horizontal scan result when the RF parameters set meets the predetermined standard.

6. The wireless electronic device as claimed in claim 5, wherein the storage device is arranged to store a plurality of antenna pattern tables, and each of the antenna pattern tables is arranged to store a plurality of antenna patterns and a plurality of predetermined RF parameters set, wherein the antenna patterns correspond to the predetermined RF parameters, respectively, and the wireless communication module is arranged to enable the adaptive antenna device according to the antenna pattern, wherein each of the antenna patterns is arranged to determine one of the certain horizontal directions and one of the certain vertical directions of the adaptive antenna device for directionally transmitting data, and each of the antenna patterns is arranged to control a wireless channel.

7. The wireless electronic device as claimed in claim 6, wherein the processing unit is further arranged to select one of the antenna patterns from one of the antenna pattern tables according to the updated connection table, and the wireless communication module is further arranged to enable the horizontal antenna module and the vertical antenna module according to the least one antenna pattern selected by the processing unit for directionally transmitting data to the electronic device in the certain horizontal direction.

8. A wireless transmission method, applied to a wireless electronic device, wherein the wireless electronic device comprises an adaptive antenna device having a horizontal antenna module and a vertical antenna module, and the wireless transmission method comprises:

enabling the horizontal antenna module of the adaptive antenna device to scan signals along a plurality of certain horizontal directions, respectively, to obtain a horizontal scan result when the wireless electronic device is powered up;

determining whether a electronic device is available in one of the certain horizontal directions, respectively, according to the horizontal scan result; and enabling the vertical antenna module to form a vertical radiation pattern on the one of the certain horizontal directions in which the electronic device is available.

9. A wireless transmission method as claimed in claim 8, further comprising storing the horizontal scan result in a register, wherein the horizontal scan result comprises a MAC address and a RF parameters set corresponding to the electronic device.

10. A wireless transmission method as claimed in claim 9, wherein the step of determining whether the at least one electronic device is available in one of the certain horizontal directions further comprises:

determining whether the RF parameters set meets a predetermined standard;

determining that the electronic device is arranged in the one of the certain horizontal directions when the RF parameters set meets the predetermined standard; and ignoring the RF parameters set when the RF parameters set does not meet the predetermined standard.

11. A wireless transmission method as claimed in claim 10, wherein the wireless electronic device further comprises a connection table and a network management database, wherein the connection table is arranged to record the MAC addresses of electronic devices connected with the wireless electronic device, and the network management database is arranged to record the RF parameters sets of electronic devices connected with the wireless electronic device.

12. A wireless transmission method as claimed in claim 11, further comprising updating the connection table and the network management database based on the RF parameters set and the corresponding MAC address of the horizontal scan result when the RF parameters set meets the predetermined standard.

13. A wireless transmission method as claimed in claim 12, wherein the wireless electronic device further comprises a plurality of antenna pattern tables, and each of the antenna pattern tables is arranged to store a plurality of antenna patterns and a plurality of predetermined RF parameters sets, wherein the antenna patterns correspond to the predetermined RF parameters, respectively, and each of the antenna patterns is arranged to determine one of the horizontal directions and one of the vertical directions of the adaptive antenna device for directionally transmitting data, and each of the antenna patterns is arranged to control a wireless channel.

14. A wireless transmission method as claimed in claim 13, wherein the step of enabling the horizontal antenna module and the vertical antenna module further comprises:

selecting one of the antenna patterns from one of the antenna pattern tables according to the updated connection table; and enabling the horizontal antenna module and the vertical antenna module of the adaptive antenna device according to the selected antenna pattern for directionally transmitting data to the electronic device in the certain horizontal direction.

\* \* \* \* \*